US008368889B2

(12) United States Patent
Schwiegerling et al.

(10) Patent No.: US 8,368,889 B2
(45) Date of Patent: Feb. 5, 2013

(54) COMPACT SNAPSHOT POLARIMETRY CAMERA

(75) Inventors: James T. Schwiegerling, Tucson, AZ (US); Eustace Dereniak, Tucson, AZ (US); Michael W. Kudenov, Tucson, AZ (US); Haitao Luo, New York, NY (US); Kazuhiko Oka, Hokkaido (JP); Edward A. DeHoog, Long Beach, CA (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 502 days.

(21) Appl. No.: 12/595,079

(22) PCT Filed: Apr. 11, 2008

(86) PCT No.: PCT/US2008/060006
§ 371 (c)(1),
(2), (4) Date: Jul. 13, 2010

(87) PCT Pub. No.: WO2008/128024
PCT Pub. Date: Oct. 23, 2008

(65) Prior Publication Data
US 2010/0271475 A1 Oct. 28, 2010

Related U.S. Application Data

(60) Provisional application No. 60/923,129, filed on Apr. 12, 2007, provisional application No. 61/063,561, filed on Feb. 4, 2008.

(51) Int. Cl.
*G01J 4/00* (2006.01)
(52) U.S. Cl. ...................................................... 356/367
(58) Field of Classification Search .................. None
See application file for complete search history.

(56) References Cited

U.S. PATENT DOCUMENTS

| 3,741,661 | A | 6/1973 | Yamamoto et al. |
|---|---|---|---|
| 4,905,169 | A | 2/1990 | Buican et al. |
| 5,521,705 | A | 5/1996 | Oldenbourg et al. |
| 6,023,061 | A | 2/2000 | Bodkin |
| 6,122,404 | A | 9/2000 | Barter et al. |
| 6,552,836 | B2 | 4/2003 | Miller |
| 6,721,096 | B2 * | 4/2004 | Bruzzone et al. ........ 359/489.09 |
| 7,038,776 | B1 | 5/2006 | Ansley et al. |
| 7,061,613 | B1 * | 6/2006 | Huang et al. .................. 356/364 |
| 7,277,182 | B2 | 10/2007 | Wegmann et al. |
| 7,336,360 | B2 | 2/2008 | Oka et al. |
| 2006/0077581 | A1 | 4/2006 | Schwiegerling et al. |
| 2006/0238759 | A1 | 10/2006 | Okabe et al. |
| 2007/0146632 | A1 | 6/2007 | Chipman |

FOREIGN PATENT DOCUMENTS

WO    WO 2008/128024 A1    10/2008

OTHER PUBLICATIONS

Zhang "A Static polarization imaging spectromer based on a Savart polariscope" Optics Communications, 203:21-26, 2002.

(Continued)

*Primary Examiner* — Tu Nguyen
(74) *Attorney, Agent, or Firm* — Greenlee Sullivan P.C.

(57) ABSTRACT

An imaging polarimeter optics unit comprising: a first polarization-sensitive beam-splitter optic, a retarder, a second polarization-sensitive beam-splitter optic, and an analyzer, through which input light passes in sequence, wherein the retarder and polarization-sensitive beam-splitters cause the input light to have optical components that provide different information about the state of polarization of the input beam is provided.

24 Claims, 7 Drawing Sheets

OTHER PUBLICATIONS

Wolff, Polarization Camera Technology: A New Sensor Modality for Image Understanding, http://www.cs.cmu.edu/afs/cs/user/tk/www/Projects_www/IU_white_paper/range/wolff.html, retrieved on Mar. 24, 2008.

Barlow G. J., "CMOS active pixel sensor for a polarization-diference camera," NSF Summer Undergraduate Fellowship in Sensor Technologies, North Carolina State University, pp. 127-145, Jun. 1, 2010.

Ebizuka N. et al., "Development of a multichannel Fourier transform spectrometer," Applied Optics 34(34):7899-7906, 1995.

Halbo Optics, "Savart Plates," on-line product guide, http://www.halbo.com/sav_plat.htm, Mar. 24, 2008.

Hashimoto M. and Kawata S., "Multichannel Fourier-transform infrared spectrometer," Applied Optics 31(28):6096-6101, 1992.

Luo H. et al., "Modeling and optimization for a prismatic snapshot imaging polarimeter," Applied Optics 45(33):8400-8409, 2006.

Luo H., Snapshot imaging polarimeters using spatial modulation, Dissertation submitted to Committee on Optical Science for Degree of Doctor of Philosophy, Graduate College, University of Arizona, 151 pages, 2008.

Meisenheimer K. and Roser H.-J., "CCD polarimetry using a savart plate," ESO-OHP Workshop on Optimization of the Use of CCD Detectors in Astronomy, Saint-Michel-l'Observatoire, France, Jun. 17-19, 1986, Proceedings (A88-13301 03-89); Garching, Federal Republic of Germany, European Southern Observatory, p. 227-236, 1987.

Oka K. and Kaneko T., "Compact complete imaging polarimeter using birefringent wedge prisms," Optics Express 11(13):1510-1519, 2003.

Oka K. and Saito N., "Snapshot complete imaging polarimeter using Savart plates," Proceedings of SPIE 6295 629508, 7 pages, 2006.

Sirohi R. S. and Kothiyal M. P., Optical Components, Systems, and Measurement Techniques, Dekker, Chapter 2, p. 68, 1991.

* cited by examiner

Object angle (0°, 0°)  Object angle (25°, 25°)

(a) Spot diagrams at the image plane

Object angle (0°, 0°)  Object angle (25°, 25°)

(b) Ray shearing diagrams (a) Raw image (b) Stokes images

COMPACT SNAPSHOT POLARIMETRY CAMERA

CROSS-REFERENCE TO RELATED APPLICATIONS

This application is the U. S. National Stage of International Application No. PCT/US2008/060006, filed Apr. 11, 2008, which claims the benefit of U.S. provisional application Serial No. 60/923,129, filed Apr. 12, 2007, and U.S. provisional application Serial No. 61/063,561, filed Feb. 4, 2008, all of which are hereby incorporated by reference to the extent not inconsistent with the disclosure herein.

REFERENCE TO FEDERAL FUNDING SUPPORT

This invention was made with government support under Grant Number R21 EY015499 awarded by NIH. The government has certain rights in the invention.

BACKGROUND OF THE INVENTION

Electromagnetic radiation contains intensity, color (wavelength), and polarization information. The human eye and conventional cameras are not polarization sensitive. The polarization parameters of light are orthogonal to the direction of propagation of the light. The state of polarization ("SOP") from an image is determined from the four Stokes vectors. As the light interacts with objects in the environment, the polarization parameters of light are altered in a fashion directly related to the material composition, surface roughness of objects and shape of the objects. A man-made object has a different polarimetric image than a natural object, for example. Polarization parameters are not affected by color camouflage, fog, or other traditional optical obstructions and so contain important information that can be used in a variety of applications such as military applications, astronomical observation, remote sensing, security surveillance, and terrain avoidance.

In addition to conventional uses of polarized images, miniaturized systems are becoming increasingly important, for example, in medical imaging and surveillance applications. A miniaturized polarimeter could provide diagnostic information in an endoscopic application, for example.

A variety of polarimeters have been developed. Conventional polarimetric instruments require rotating or moving parts to acquire the complete Stokes vectors. Rotating and moving parts require additional control systems, add complexity to the instrument, add mechanical noise and increases risk of breakage. In addition, a rotational or motional scheme requires several measurements to be taken to acquire state of polarization information from the object, limiting measurements to static scenes and slowing frame rates for video acquisition. Some instruments determine state of polarization information from an object by splitting the incident beam into spatially resolved parts determined by the polarization vector, and detecting the different spatial parts separately. These systems have additional complexity, lower resolution, higher cost and other disadvantages.

There is a need in the art for an improved system for providing real-time polarization information, as well as a need for a miniaturized polarimeter.

BRIEF SUMMARY OF THE INVENTION

Provided is a system for obtaining state of polarization information from an image. The provided system is scalable in size, requires no moving parts, captures the SOP in a single measurement, and can be extended to video recording technologies.

More specifically, provided is an imaging polarimeter optics unit comprising: a first polarization-sensitive beam-splitter optic, a retarder, a second polarization-sensitive beam-splitter optic, and an analyzer, through which input light passes in sequence, wherein the retarder and polarization-sensitive beam-splitters cause the input light to have optical components that provide different information about the state of polarization of the input beam.

Also provided is a method for determining polarization properties of light from an object, comprising the steps of: providing an optical path from the object to a detector; providing in the optical path an optics unit of the invention; detecting the image at the detector; and calculating polarization properties of the image at the detector.

In one embodiment, the analyzer is arranged such that a transmission axis of the analyzer is not coincident with the direction of an optical axis of the second polarization-sensitive beam-splitter optic. In one embodiment, a polarization-sensitive beam-splitter optic is a Savart plate. In one embodiment, both first and second polarization-sensitive beam-splitter optics are Savart plates. In one embodiment, the analyzer is arranged such that a transmission axis of the analyzer is arranged at an angle of 45° with respect to the direction of an optical axis of the second polarization-sensitive beam-splitter optic. In one embodiment, the retarder is a half-wave plate. In one embodiment, the optics unit further comprises a focusing lens. In one embodiment, the optics unit further comprises an imaging lens. In one embodiment, a detector is positioned at the focal point (or image plane) of the focusing (or imaging) lens. In one embodiment, a Fourier transform lens is placed at or about the focal point or focal plane of the focusing lens. In one embodiment, the optics unit further comprises a detector or image sensor. In one embodiment, the detector is a CCD. In one embodiment, the detector is CMOS. In one embodiment the detector is a camera. In one embodiment, the detector is a miniature camera. In one embodiment, the detector is a cell-phone camera. In one embodiment, the optics unit is less than 1.5 cm long. It is known that the Fourier transform can be taken optically, instead of post-processing the captured image in software. Optical Fourier transformation embodiments are included in the disclosure herein, and the description herein can be modified to take into account these embodiments without undue experimentation.

Also provided is a polarimetry camera comprising: a first Savart plate; a half-wave plate; a second Savart plate; an analyzer; a lens; and an image sensor, through which input light passes in sequence along an optical axis, wherein the half-wave plate is positioned so that an optical axis of the half-wave plate forms an angle of 22.5° with respect to the direction of the optical axis of the first Savart plate, an optical axis of the first and second Savart plates are substantially the same, and the transmission axis of the analyzer forms an angle of 45° with an optical axis of the second Savart plate. The image sensor can be a camera. The image sensor can be a display. The image sensor can be a conventional detector, such as a CCD or CMOS. In an embodiment, the half-wave plate is optional, as long as light passing through the polarization-sensitive beam splitters is sheared to interfere at the image plane.

Also provided is a method for determining polarization properties of light from an object, comprising the steps of: providing an optical path from the object to a detector; providing in the optical path an optics unit described herein;

detecting the image at the detector; calculating polarization properties from the image at the detector. In one embodiment, polarization properties are the Stokes vectors. In one embodiment, polarization properties are based on the Stokes vectors such as ellipticity angle or azimuth angle. It is understood that all available information about polarization properties of the image does not need to be measured or calculated. In one embodiment, the calculating step comprises performing a Fourier transform analysis of the image at the detector.

Also provided is a method for determining polarization properties of light from an object, comprising the steps of: providing an optical path from the object to a detector; providing in the optical path an optics unit described herein; detecting the optical Fourier transform of the image at the detector; calculating polarization properties from the optical Fourier transform at the detector.

DETAILED DESCRIPTION OF THE INVENTION

Figure 1:
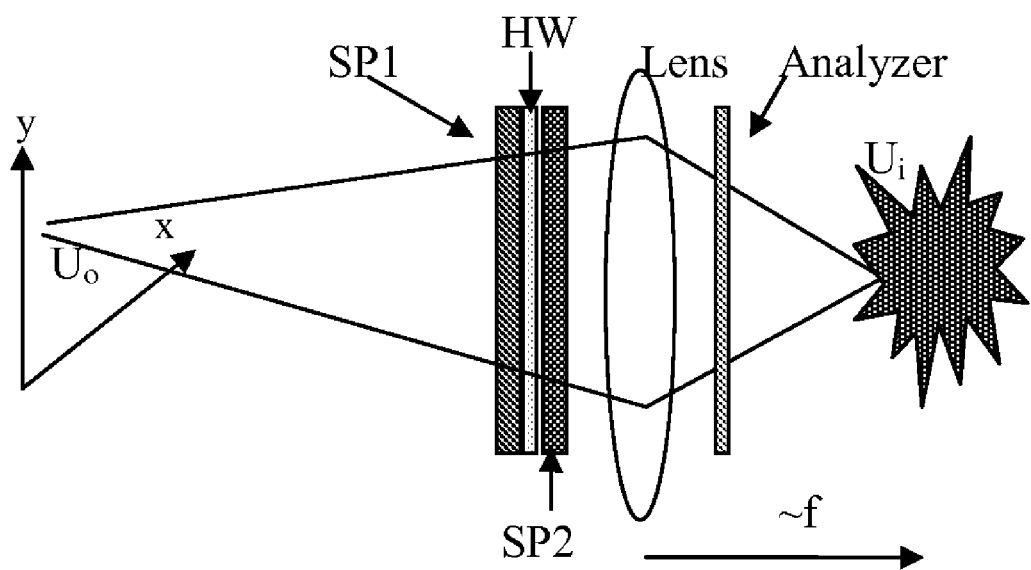
FIG. 1 is a schematic of one embodiment of the system.

The following nonlimiting description is intended to provide examples of some embodiments of this invention and further information about the operation of the invention. Although theory is presented, Applicant does not intend to be bound by the operational theory presented.

The term "electromagnetic radiation" and "light" are used synonymously in the present description and refer to waves of electric and magnetic fields. As used herein, the transmission or optic or optical or principal axis is defined as is customary in the art.

"Optical communication" refers to a configuration of two or more elements wherein one or more beams of electromagnetic radiation are capable of propagating from one element to the other element. Elements in optical communication may be in direct optical communication or indirect optical communication. "Direct optical communication" refers to a configuration of two or more elements wherein one or more beams of electromagnetic radiation propagate directly from a first device element to another without use of optical components for steering and/or combining the beams. "Indirect optical communication" on the other hand refers to a configuration of two or more elements wherein one or more beams of electromagnetic radiation propagate between two elements via one or more device components including, but not limited to, wave guides, fiber optic elements, reflectors, filters, prisms, lenses, gratings and any combination of these device components. Although the description is provided here with specific components, it is understood that other components such as fiber optics and waveguides may be used in the invention. The operation and use of other components is well understood by one of ordinary skill in the art. Also, the description is provided here with minimal other optics components in the system. It is understood that other optics, such as filters, lens and other optics may be used with the system. The operation and selection of such optics is well understood by one of ordinary skill in the art. The methods and devices described herein can be used in any desired frequency or wavelength range, provided the optics are capable of having the described function in the desired portion of the electromagnetic spectrum. In one embodiment, the methods and devices described herein are used in the visible portion of the spectrum. In one embodiment, the methods and devices described herein are used in the infrared portion of the spectrum.

As used herein, a "polarization-sensitive beam-splitter optic" is any suitable structure that changes the physical location of a portion of an incident light beam that has a different polarization parameter than another portion of the incident light beam. Examples of polarization-sensitive beam-splitter optics are Savart plates and prisms. It is possible to use different types of polarization-sensitive beam-splitter optics in a given system, such as one SP and one prism.

As used herein, a "Savart plate" ("SP") takes the conventional meaning in the art, and generally comprises two beam splitting plates with their optic axes at 45° to the surface normal, rotated 90° with respect to each other. Savart plates may be made from any suitable material, such as calcite or quartz, or materials with higher birefringence, such as rutile and yttrium vanadate. Savart plates may be square or round or any other suitable shape. The size of the Savart plates used may be any desired size, such as for example in the case where a round plate is used, approximately 50 mm in diameter, larger than 50 mm in diameter, approximately one inch in diameter, approximately one half inch in diameter, approximately 10 mm in diameter, less than 5 mm in diameter, less than 1 mm in diameter. The size of the Savart plates used in the invention is a factor in determining the overall size of the device.

As used herein, an "analyzer" modifies the polarization of incident light. The analyzer forces the electric-field vector to lie in the analyzer's transmission axis so that different wavefront components can interfere along this axis.

As used herein, a "retarder" is a component that alters the polarization state of a light wave traveling through it. Wave plates are examples of retarders. A quarter-wave plate creates a quarter wavelength phase shift between the light incident on the wave plate and the light exiting the wave plate. In other words, a quarter-wave plate creates a quarter wavelength phase shift between two eigen-polarization states traveling through the retarder. A half-wave plate creates a half wavelength phase shift between the light incident on the wave plate and the light exiting the wave plate (two eigen-polarization states traveling through the retarder).

The provided imaging system does not require moving polarization elements. The provided imaging system can be made in any desired size. The provided imaging system described here can be used with or retrofitted to any camera or imaging system, such as a cell phone camera or "spy camera," or with a medical imaging system. The system of the invention may be simply placed in front of a conventional imaging system, or the system of the invention can be designed into the imaging system.

The provided imaging system described here requires few optical components. Specifically, the provided imaging system does not require a focusing or collimating lens in the front of the system. The system described here can be used at any focal length, and the useful focal length is not fixed. In certain systems, such as those used for astronomy, there is a telescope positioned at the front of the system because of focal length limitations. The provided imaging system does not have this requirement or limitation. The provided imaging system is suitable for imaging scenes/objects whose distances vary within a large range from approximately 1 mm to infinity. Other useful distances include from 2 meters to infinity (for a portable device as FIG. 5), and less then 5 cm to infinity for a miniature device. In the provided system, there is no need to change the focal length of the front optics for focusing of each image.

The provided imaging system can measure the complete Stokes parameters ($S_0$ through $S_3$) in a single image. In one embodiment, no moving parts are used in the system. The provided imaging system is described with more specificity using the following description.

FIG. 1 shows the general structure of one embodiment of the imaging polarimetry system of the invention. In this embodiment, two pairs of Savart Plates are placed in front of a normal camera. In all embodiments of the invention, the analyzer and lens can be positioned in any desired configuration. The analyzer may be in front of the lens along the optical path, or the lens may be in front of the analyzer along the optical path. If the analyzer is in front of the lens, the throughput or image quality should be higher than in the alternative configuration.

Figure 2:
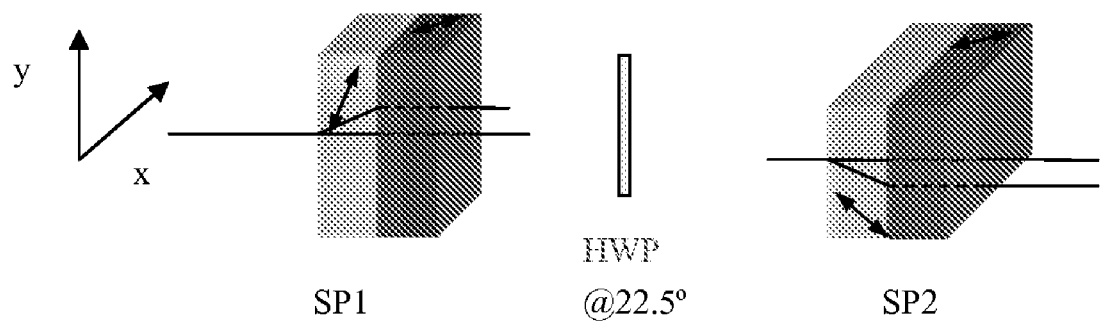
FIG. 2 shows the Savart plate portion of the system. Black solid double arrows indicate optic axes of the Savart Plates.

FIG. 2 shows additional details about the Savart plate portion of the imaging system.

Figure 3:
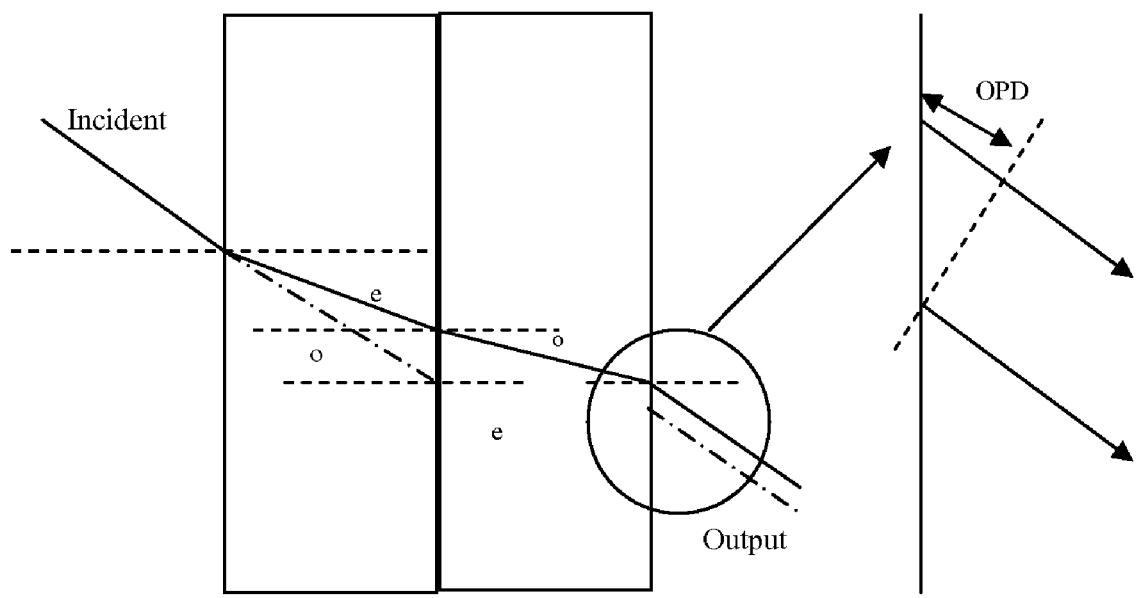
FIG. 3 shows the optical path difference ("OPD") generated by the Savart Plate with a random incident angle

FIG. 3 shows the straight line fringes formed on the image plate (or plane) as the OPD between the two rays varies linearly with the incident angle. Notice that this fringe pattern is produced by two orthogonal polarization components. Therefore, the polarization information of the image can be deconvoluted by analyzing the fringe pattern. For a complete acquisition of the Stokes Vectors, two Savart Plates are needed to generate four relatively shear beams to interfere at the imaging plane. In an alternative embodiment, the concepts described here can be used with only one polarization-sensitive beam-splitter, such as one Savart plate. The system will then provide information about only a part of the Stokes vectors. This may be useful in systems where space is extremely limited.

Each Savart Plate generates a shear perpendicular to the other. A half-wave plate (HWP) rotated by 22.5° is inserted between the two Savart Plates to make a 45° angle of the electric field vector of the emerging ray from SP1 with respect to the optic axis of SP2, shown in FIGS. 1 and 2. Although specific angles are provided here and in other places in this disclosure, it is understood that the given angles are not exact requirements, and that angles that are somewhat different from the provided angles may be used, and are intended to be included in the disclosure. For example, angles up to ±5 and up to ±10 and up to ±15 percent from the provided angles are included. Larger discrepancies may also be used, provided that the function described herein if fulfilled.

As a result of the emerging ray patterns, an image with multiple fringe pattern superimposed on each is obtained, which can be written as $$I_i(x_i, y_i) = \frac{1}{2}S_0 + \frac{1}{2}\cos(2\pi\Omega(x_i + y_i))S_1 + \frac{1}{4}|S_{23}|\cos[2\pi(2\Omega)x_i - \arg(\Phi_{23})] - \frac{1}{4}|S_{23}|\cos[2\pi(2\Omega)y_i + \arg(\Phi_{23})]$$

Eq. 1 where $S_0$, $S_1$, $S_2$, and $S_3$ represent the spatially-dependent Stokes parameters on the object, and $\Omega$ denotes the fringe spatial frequency resulting from the beam shear of the Savart Plates.

Eq. 1 is derived by tracing the rays through the Savart Plate and imaging lens, recording the optical path length and polarization status. The detailing mathematic derivation is well explained in the literature. The four Stokes parameters are separated into individual channels in the frequency domain, and thus can be reconstructed simultaneously from a single image using Fourier transform.

Figure 4:
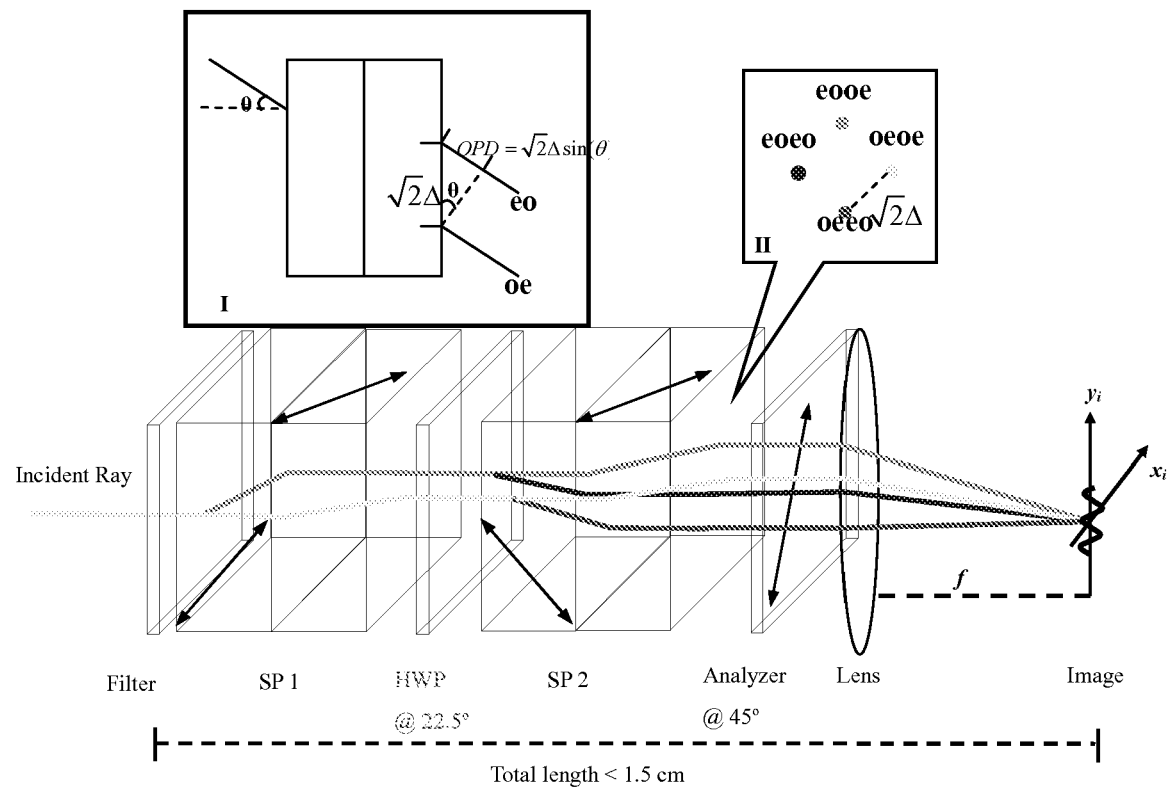
FIG. 4 shows an optical layout with ray tracing shown. The inset I illustrates the OPD formation of a Savart plate between two orthogonal polarization beams in the case of a skewed incident ray. The insert II shows the four emerging rays off the back surface of SP 2. The "e" (extraordinary) and "o" (ordinary) letters denotes the polarization consequences through the system.

The theory and operation are now described in more detail. FIG. 4(a) illustrate a more detailed view of one embodiment of the imaging system's optical layout, which contains two Savart Plates sandwiching a half wave plate (HWP) oriented at 22.5°, an analyzer at 45°, and a mini camera with a bandpass filter. Each Savart Plate is a beam shearing element where two orthogonal polarization components, the ordinary (o-) and extraordinary (e-) lights experience a parallel shearing from each other after propagating through the SP. This shearing is crucial in that it creates an optical path difference (OPD) between the o-ray and e-ray that varies linearly with the incident angle θ as illustrated by insert I of FIG. 4 (a). With the imaging lens, the incident angle can be directly interpreted by the coordinates at the image plane. The combination of the two SPs and HWP generates four output rays from a common incident ray, with equal and diagonal shearing as illustrated in insert II of FIG. 4(a). Note that the HWP at 22.5° rotates the electric field vector by 45°, enabling the second SP to shear the beams exiting the first SP. At the end, the imaging lens recombines the four rays and the rays mutually interfere at the image plane. The resultant interferogram can be detected by the insertion of an analyzer at 45°.

A fringe decomposition model based on the above geometrical interpretation to derive the total intensity pattern can be applied. The total irradiance at the image plane is a sum of the four rays and their mutual interference contributions, as $$I = \left\langle \left| \frac{1}{2}E_y(t)e^{-i\varphi_1} - \frac{1}{2}E_y(t)e^{-i\varphi_2} + \frac{1}{2}E_x(t)e^{-i\varphi_3} + \frac{1}{2}E_x(t)e^{-i\varphi_4} \right|^2 \right\rangle$$

Eq. 2 where the bracket stands for the time average and each term in the bracket represents the electric field of a ray after the analyzer. $\varphi_1$ through $\varphi_4$ denote the accumulative phase of each ray path. By geometric relations, $\varphi_1$ through $\varphi_4$ can be written as:

$$\varphi_1(x_i, y_i) = 0; \quad \varphi_2(x_i, y_i) = 2\pi\frac{\Delta}{\lambda f}(x_i, y_i); \quad \varphi_3(x_i, y_i) = 2\pi\frac{2\Delta}{\lambda f}x_i;$$

Eq. 3

-continued $$\varphi_4(x, y) = 2\pi \frac{\Delta}{\lambda f}(x_i - y_i)$$

where $x_i$ and $y_i$ are the coordinates at the image plane, $\lambda$ is the wavelength and $\sqrt{2}\Delta$ represents the shearing distance generated by a SP. Using the definition of the Stokes parameters, the intensity pattern is given as Equation. 1, where $$S_{23} = S_2 + iS_3; \text{ and } \Omega = \frac{\Delta}{\lambda f}.$$

The derivation procedure is analogous to the prismatic polarimeter provided in the references cited herein. Note in Eqs. 1 that the Stokes parameters $S_1$ through $S_3$ are modulated by various carrier frequencies, while $S_0$ remains as a DC component. This fact allows decoupling of the frequencies in the frequency domain by Fourier transformation and to recover them simultaneously by inverse Fourier transformation.

The fringe frequencies in Eqs. 1, which are called the carrier frequencies (CF) are proportional to $$\Omega = \frac{\Delta}{\lambda f}.$$

For a calcite SP, the shearing distance is given by $\sqrt{2}\Delta=0.075t$ (µm), where t is the thickness in mm of the SP. At a fixed wavelength and CFs, t is proportional to f, the focal length of the imaging lens. This becomes an important feature in that the total length of the polarimeter can be scaled by a common factor. If a miniature lens is used, then the whole device can be scaled down significantly. In a cell phone camera as an example, with f=5 mm and pixel spacing 4.75 µm, $\lambda$=0.55 µm, and $\Omega$=4 pixels/fringe. The required thickness t then equals 1.54 mm and the total length of the polarimeter is shorter than 1.5 cm, which is believed to be the smallest imaging polarimeter reported to date. If the SP material is changed from Calcite to other higher birefringent materials, the length can be further shortened. Compared to other polarization elements, the plane-parallel feature of the SP makes it more cost-effective in fabrication and assembly.

Example 1

Simulation

Figure 6:
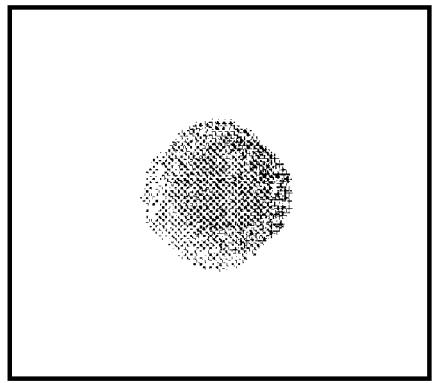
FIG. 6(a) shows simulated image spot diagrams of the polarimetry imaging system. The imaging lens is modeled as a paraxial lens. The object is 1 meter away from the imaging lens and two field points (0°, 0°) and (25°, 25°) are sampled. The off-axis spot diagram displays anisotropy.
FIG. 6(b) shows the ray shearing diagrams at the back surface of SP2 for (0°, 0°) and (25°, 25°) field points respectively. For illustration purposes, one incident ray is shown. The dotted rectangle is drawn to illustrate the diagonal shearing between the four rays.
Figure 6:
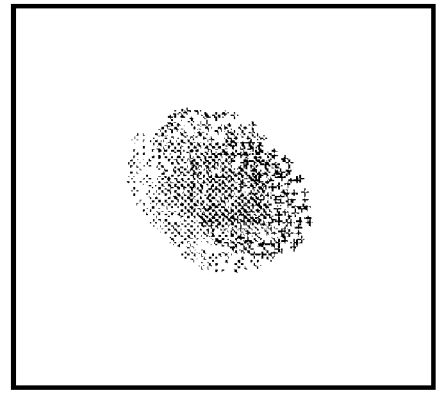
Figure 6:
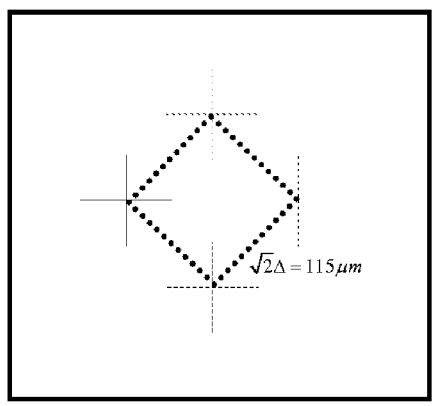
Figure 6:
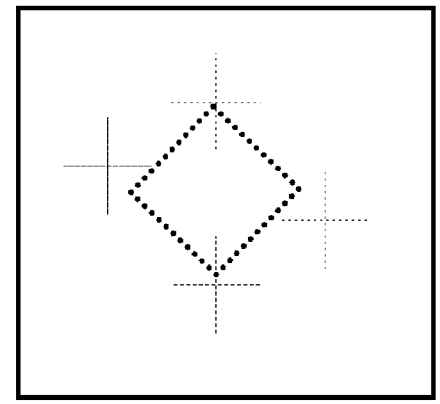

To simulate the system, the above mentioned parameters were inserted into Zemax ray tracing software (see zemax.com) with a 5 mm diameter aperture. The image spot diagrams and ray shearing diagrams from this simulation can be seen in FIG. 6. Two different field points were sampled and the object was 1 m distant. The image quality looks impressive for both the on-axis and off-axis field points, with the aberrated spot size close to the diffraction limit. This result shows the SPs do not introduce excessive aberrations when imaging a finite conjugate object. In FIG. 6(b), the on-axis ray shearing diagrams are consistent with expectation, i.e., four rays are sheared equally and diagonally with values of $\sqrt{2}\Delta=113$ µm. Conversely in the off-axis case, however, the four rays are not sheared ideally and their shearing distances are not equal to each other. Both issues are due to the asymmetry of the SP itself. This deviation worsens form on-axis to off-axis and it may affect the sinusoidal nature of the fringes, which produces errors in the reconstruction. Fortunately, this model simulation shows that such deviation worsens slowly from on-axis to off-axis and it turns out that deviations can be well calibrated by the reference image. The simulation shows that the imaging system works well in a large range of depth of focus (DOP) and a wide field of view (FOV).

Example 2

Camera-Scale System

Figure 5:
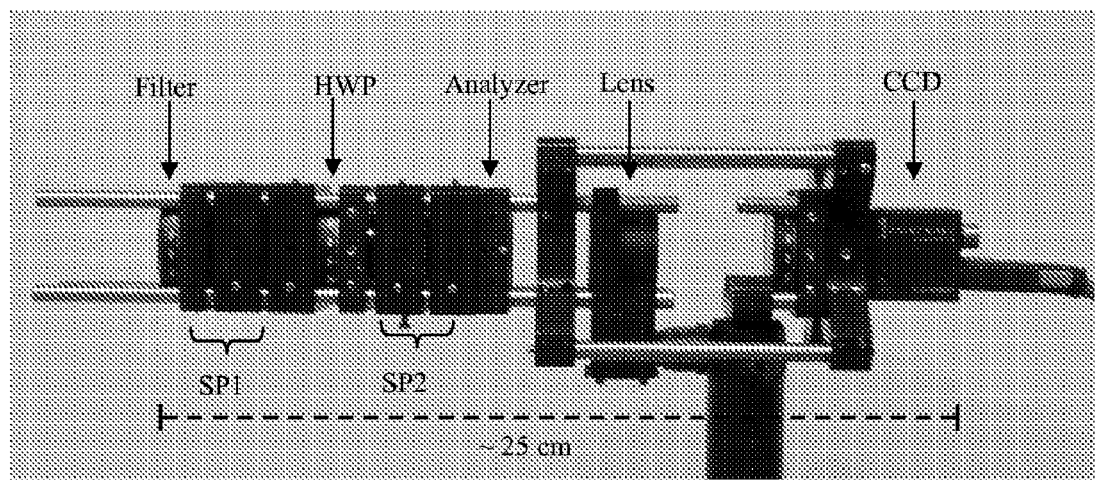
FIG. 5 shows an exemplary imaging system with a scaling factor of 15 from an exemplary system. The shown CCD camera has a pixel spacing of 4.75 μm.

A system with commercially available elements, all of which were one-inch in diameter and mounted independently was built. The SPs were manufactured by Karl Lambrecht Inc. A 75 mm focal-length lens was used, extending the total length by a factor of 15 from the imaging system. This parameter can be changed, as known in the art. A photo of the actual polarimeter built is shown in FIG. 5.

Figure 7:
FIG. 7(a) shows the raw image obtained by the polarimetry camera. A 3 nm bandwidth filter is used in front of the polarimeter.
FIG. 7(b) shows the reconstructed Stokes images of the image shown in FIG. 7(a).
Figure 7:
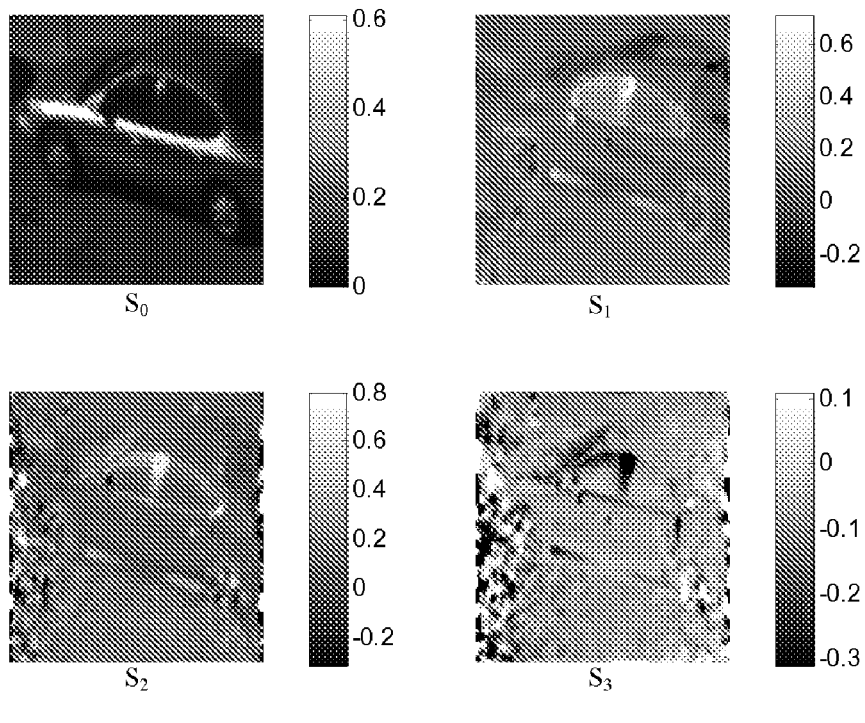

FIG. 7(a) shows a raw image obtained by the polarimetry camera and FIG. 7(b) shows the reconstructed Stokes images. A uniform polarized image was formed with a linear polarizer at 22.5° ($S_1$=0.707, $S_2$=0.707, $S_3$=0) was used as a reference to calibrate the system. The camera's viewing angle was about 60 degrees with respect to the ground and the object, a car, was about 30 m away. In FIG. 7(a), the clear fringes seen across the image indicates the existence of polarization signals. This is due to the skewed sun-object-camera angle and less scattering surfaces that are inside the scene. There is a change in the fringe pattern on various surfaces (e.g., the window) of the car, indicating that different SOPs are reflected. The reconstructed Stokes images in FIG. 7(b) also demonstrate this by clearly identifying the car in different Stokes parameters. The circular polarization (in $S_3$) is weaker than the linear polarization ($S_1$ and $S_2$). The region around the broken ground (below the car in the image) looks noisy, because it contains higher frequency contents that the processing algorithm cannot fully recover. The processing can be changed if desired, to take into account this higher frequency content.

Example 3

Miniature System

Following the theory and teachings herein, a miniaturized system can be built. A miniature system can modify a cell phone camera with f=5 mm and pixel spacing 4.75 µm, $\lambda$=0.55 µm, and $\Omega$=4 pixels/fringe. The required thickness t then equals 1.54 mm and the total length of the polarimeter is shorter than 1.5 cm. The elements can be glued together using appropriate glue and simply placed or glued in front of a miniature camera such as a cell phone camera.

Other size systems can be made using the teachings described herein. The systems include the necessary optics and light guiding as required for a given application. For example, all systems may include a computer having the necessary program for the analysis of the waveforms.

REFERENCES

N. Saito and K. Oka, "Two-dimensional measurement of polarization using spatial carrier," in *Extended Abstracts of the 47th Spring Meeting of the Japan Society of Applied Physics and Related Societies*, p. 1001, Japan Society of Applied Physics, (Tokyo), 2000.

K. Oka and N. Saito, "Snapshot complete imaging polarimeter using Savart plates", SPIE 6295-9, 1 (2006).

R. S. Sirohi and M. P. Kothiyal, *Optical Components, Systems, and Measurement Techniques*, (Dekker, 1991), Chap. 2, p. 68.

D. Goldstein, *Polarized light*, 2nd ed. (Dekker, 2003), Chap. 4, p. 60.

H. T. Luo, K. Oka, N. Hagen, T. Tkaczyk, E. L. Dereniak, "Modeling and optimization of a prismatic snapshot imaging polarimeter", Appl. Optics, 45, 8400-8409 (2006).

K. Oka and T. Kaneko, "Compact complete imaging polarimeter using birefringent wedge prisms", Opt. Express 11, 1510-1518 (2003)

Klaus Meisenheimer and Hermann-Josef Röser, "CCD polarimetry using a Savart plate", in ESO-OHP Workshop on the Optimization of the Use of CCD Detectors in Astronomy, Saint-Michel-l'Observatoire, France, Jun. 17-19, 1986, Proceedings (A88-13301 03-89). Garching, Federal Republic of Germany, European Southern Observatory, 1987, p. 227-236.

Noboru Ebizuka, Moriaki Wakaki, Yukiyasu Kobayashi, and Syuji Sato, "Development of a Multichannel Fourier transform spectrometer", Applied Optics, vol. 34, pp 7899-7906 (1995)

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a structure is claimed, it should be understood that structures known in the prior art, including certain structures disclosed in the references disclosed herein (particularly in referenced patent documents), are not intended to be included in the claim.

When a group of substituents is disclosed herein, it is understood that all individual members of those groups and all subgroups of the group members, and classes of group members that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of optics and other materials are intended to be exemplary, as it is known that one of ordinary skill in the art can name the same optics and materials differently. One of ordinary skill in the art will appreciate that methods, device elements, starting materials, imaging methods, and analysis methods other than those specifically exemplified can be employed in the practice of the invention without resort to undue experimentation. All art-known functional equivalents, of any such methods, device elements, starting materials, imaging methods, and analysis methods are intended to be included in this invention. Whenever a range is given in the specification, for example, a distance range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a structure or in a description of elements of a device, is understood to encompass those structures and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions are provided to clarify their specific use in the context of the invention.

We claim:

1. An imaging polarimeter optics unit comprising:
a first polarization-sensitive beam-splitter optic, a retarder, a second polarization-sensitive beam-splitter optic, and an analyzer, through which input light passes in sequence, wherein the retarder and polarization-sensitive beam-splitters cause the input light to have optical components that provide different information about the state of polarization of the input beam.

2. The optics unit of claim 1, wherein the analyzer is arranged such that a transmission axis of the analyzer is not coincident with the direction of the principal axis of the second polarization-sensitive beam-splitter optic.

3. The optics unit of claim 1, wherein a polarization-sensitive beam-splitter optic is a Savart plate.

4. The optics unit of claim 1, wherein both first and second polarization-sensitive beam-splitter optics are Savart plates.

5. The optics unit of claim 1, wherein the analyzer is arranged such that a transmission axis of the analyzer is arranged at an angle of 45° with respect to the direction of the principal axis of the second polarization-sensitive beam-splitter optic.

6. The optics unit of claim 1, wherein the retarder is a half-wave plate.

7. The optics unit of claim 1, further comprising a focusing lens.

8. The optics unit of claim 7, further comprising a Fourier transform lens placed at or about the focal point of the focusing lens.

9. The optics unit of claim 8, further comprising a detector.

10. The optics unit of claim 9, wherein the detector is a CCD or CMOS.

11. A method for determining polarization properties of light from an object, comprising the steps of:
  providing an optical path from the object to a detector;
  providing in the optical path an optics unit of claim 8;
  detecting the optical Fourier transform of the image at the detector;
  calculating polarization properties from the optical Fourier transform at the detector.

12. The method of claim 11, wherein polarization properties are the Stokes Vectors.

13. The method of claim 11, wherein polarization properties are the Stokes vectors in the infrared spectrum.

14. The optics unit of claim 1, further comprising a detector.

15. The optics unit of claim 14, wherein the detector is a CCD or CMOS.

16. The optics unit of claim 14, wherein the detector is a camera.

17. The optics unit of claim 14, wherein the detector is a miniature camera.

18. The optics unit of claim 14, wherein a detector is positioned at the focal plane of the focusing lens.

19. The optics unit of claim 1, wherein the optics unit is less than 1.5 cm long.

20. A method for determining polarization properties of light from an object, comprising the steps of:
  providing an optical path from the object to a detector;
  providing in the optical path an optics unit of claim 1;
  detecting the image at the detector;
  calculating polarization properties from the image at the detector.

21. The method of claim 20, wherein polarization properties are the Stokes vectors.

22. The method of claim 20, wherein polarization properties are the Stokes vectors in the infrared spectrum.

23. The method of claim 20, wherein the calculating step comprises performing a Fourier transform analysis of the image at the detector.

24. A polarimetry camera comprising:
  a first Savart plate;
  a second Savart plate;
  a half-wave plate;
  an analyzer;
  a lens; and
  a sensor, through which input light passes in sequence along an optical axis,
  wherein the half-wave plate is positioned so that the optical axis of the half-wave plate forms an angle of 22.5° with respect to the direction of the optical axis of the first Savart plate, the optical axis of the first and second Savart plates are substantially the same, and the transmission axis of the analyzer forms an angle of 45° with the transmission axis of the second Savart plate.

* * * * *